US011546960B2

(12) United States Patent
Koizumi

(10) Patent No.: US 11,546,960 B2
(45) Date of Patent: Jan. 3, 2023

(54) ELECTRONIC APPARATUS FOR PERFORMING SELF-REPAIR AND REBOOT FOR WIRELESS CONNECTION AND COMMUNICATION CONTROL METHOD FOR PERFORMING SELF-REPAIR AND REBOOT FOR WIRELESS CONNECTION

(71) Applicant: SEIKO EPSON CORPORATION, Tokyo (JP)

(72) Inventor: Junpei Koizumi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 83 days.

(21) Appl. No.: 17/210,603

(22) Filed: Mar. 24, 2021

(65) Prior Publication Data
US 2021/0307103 A1    Sep. 30, 2021

(30) Foreign Application Priority Data
Mar. 26, 2020    (JP) .............................. JP2020-055462

(51) Int. Cl.
| | | |
|---|---|---|
| *G06F 15/00* | (2006.01) | |
| *G06F 1/00* | (2006.01) | |
| *G06K 1/00* | (2006.01) | |
| *H04W 76/19* | (2018.01) | |
| *G06F 3/12* | (2006.01) | |
| *H04W 88/08* | (2009.01) | |

(52) U.S. Cl.
CPC .......... *H04W 76/19* (2018.02); *G06F 3/1203* (2013.01); *G06F 3/123* (2013.01); *G06F 3/1292* (2013.01); *H04W 88/08* (2013.01)

(58) Field of Classification Search
CPC .... G06F 3/1204; G06F 3/1236; G06F 3/1292; H04W 76/19; H04W 88/08
USPC ............................... 358/1.15, 1.14, 1.13, 1.1
See application file for complete search history.

(56) References Cited

U.S. PATENT DOCUMENTS

| | | | |
|---|---|---|---|
| 2011/0019826 A1* | 1/2011 | Browning | H04W 24/00 380/283 |
| 2017/0366983 A1* | 12/2017 | Gunasekara | H04L 43/0811 |
| 2018/0014480 A1* | 1/2018 | Montgomery | G05B 19/042 |

FOREIGN PATENT DOCUMENTS

JP    2018-015997 A    2/2018

* cited by examiner

*Primary Examiner* — Douglas Q Tran
(74) *Attorney, Agent, or Firm* — Global IP Counselors, LLP

(57) ABSTRACT

An electronic apparatus includes: a wireless communication unit wirelessly communicating with an external access point; and a processing unit performing communication control for the wireless communication unit. The processing unit performs uninstallation of driver software causing the wireless communication unit to operate and installation of the driver software after the uninstallation, as a self-repair and reboot, when there is an error in wireless connection with the external access point.

9 Claims, 11 Drawing Sheets

ELECTRONIC APPARATUS FOR PERFORMING SELF-REPAIR AND REBOOT FOR WIRELESS CONNECTION AND COMMUNICATION CONTROL METHOD FOR PERFORMING SELF-REPAIR AND REBOOT FOR WIRELESS CONNECTION

The present application is based on, and claims priority from JP Application Serial Number 2020-055462, filed Mar. 26, 2020, the disclosure of which is hereby incorporated by reference herein in its entirety.

BACKGROUND

1. Technical Field

The present disclosure relates to an electronic apparatus and a communication control method or the like.

2. Related Art

In wireless communication such as Wi-Fi (trademark registered) communication, there are cases where, after communication connection is established between an electronic apparatus and an external access point, an error occurs in wireless connection between the electronic apparatus and the external access point for some reason and disconnects the wireless connection. For example, JP-A-2018-15997 discloses a printing device which can communicate with a terminal device and in which, on the occurrence of a communication error, a communication control unit transmits an initialization signal to a communication unit and thus resolves the communication error.

For example, on the occurrence of an error in wireless connection between an electronic apparatus and an external access point, the wireless setting may be redone by a user operation as a method for recovering from the error state. However, redoing the wireless setting by a user operation has a problem in that it takes time and effort from the user. Also, JP-A-2018-15997 proposes no method for recovering from the error state on the occurrence of an error between an electronic apparatus and an external access point.

SUMMARY

An aspect of the disclosure relates to an electronic apparatus including: a wireless communication unit wirelessly communicating with an external access point; and a processing unit performing communication control for the wireless communication unit. The processing unit performs uninstallation of driver software causing the wireless communication unit to operate and installation of the driver software after the uninstallation, as a self-repair and reboot, when there is an error in wireless connection with the external access point.

Another aspect of the disclosure relates to a communication control method for wireless communication with an external access point via a wireless communication unit. The communication control method includes: determining whether there is an error in wireless connection with the external access point or not; and performing uninstallation of driver software causing the wireless communication unit to operate and installation of the driver software after the uninstallation, as a self-repair and reboot, when there is the error in the wireless connection with the external access point.

DESCRIPTION OF EXEMPLARY EMBODIMENTS

An embodiment will now be described. The embodiment described below should not unduly limit the content described in the appended claims. Not all the components described in the embodiment are necessarily essential components.

1. Communication System and Electronic Apparatus

Figure 1:
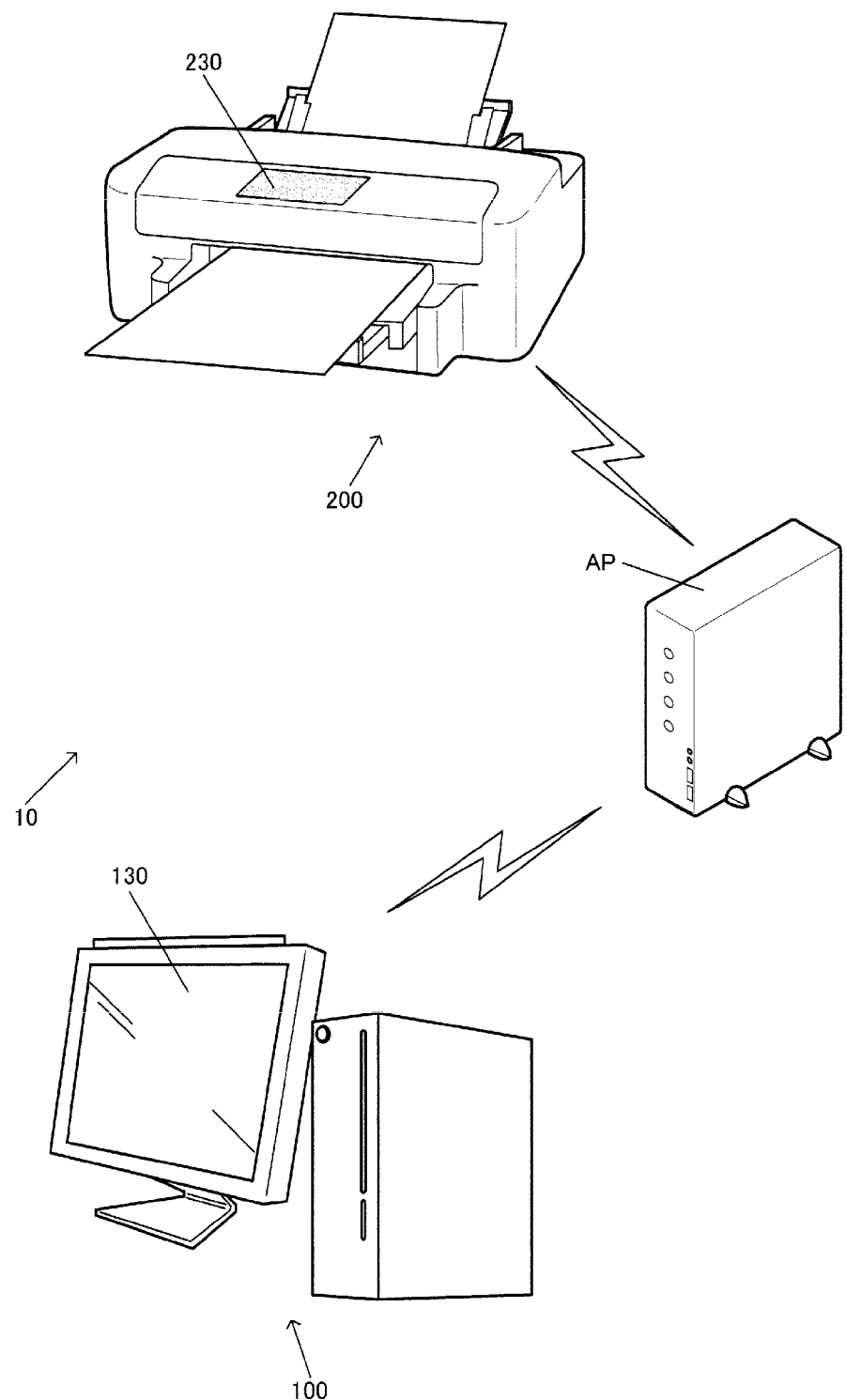
FIG. 1 shows a configuration example of a communication system where an electronic apparatus and an external access point are wirelessly connected together.

FIG. 1 schematically shows a configuration example of a communication system 10 according to this embodiment. The communication system 10 is formed of an electronic apparatus 200, an external access point AP, and a terminal device 100. As shown in FIG. 1, the electronic apparatus 200 in this embodiment wirelessly communicates with the external access point AP and is thus connected to the external access point AP. Specifically, the electronic apparatus 200 performs wireless communication via the external access point AP and is thus connected to the terminal device 100 via the external access point AP. In this embodiment, "connection by wireless communication" is referred to as "wireless connection" or simply as "connection", where appropriate. The external access point AP is, for example, a wireless router having a router function. In FIG. 1, the terminal device 100 is an information processing device such as a PC (personal computer). However, the terminal device 100 may be a portable terminal device such as a smartphone or a tablet terminal.

The electronic apparatus 200 is, for example, a printer. Alternatively, the electronic apparatus 200 may be a scanner, facsimile machine, or copy machine. The electronic apparatus 200 may be an MFP (multifunction peripheral) having a plurality of functions. An MFP having a printing function is an example of the printer. Alternatively, the electronic apparatus 200 may be a projector, head-mounted display device, wearable device, biological information measuring device, robot, video device, portable information terminal, physical quantity measuring device, or the like. The biological information measuring device is a pulse monitor, pedometer, activity tracker, or the like. The video device is a camera or the like. The portable information terminal is a smartphone, portable game machine, or the like.

The electronic apparatus 200 wirelessly communicates with the external access point AP. The wireless communication in this case is communication via a wireless LAN and specifically, for example, communication using the Wi-Fi (trademark registered) technique. The Wi-Fi technique is a wireless communication technique, for example, based on the IEEE (Institute of Electrical and Electronics Engineers) 802.11 standard and its equivalent.

Figure 2:
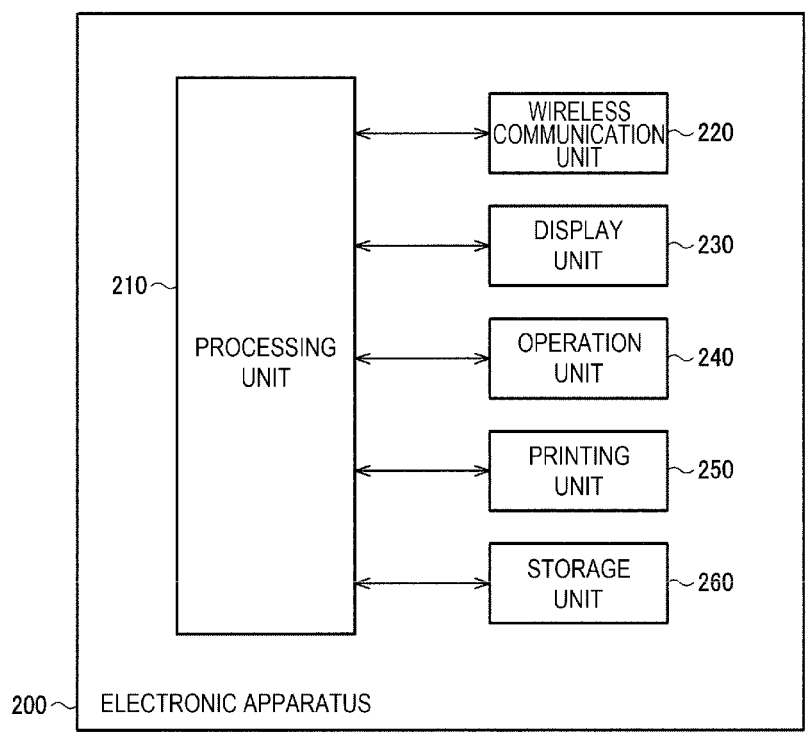
FIG. 2 shows a configuration example of an electronic apparatus according to an embodiment.

FIG. 2 is a block diagram showing an example of the configuration of the electronic apparatus 200. FIG. 2 shows the electronic apparatus 200 having a printing function. In the description below, too, an example where the electronic apparatus 200 is a printer is described according to need. However, the electronic apparatus 200 can be extended to other functions than the printer, as described above. The electronic apparatus 200 includes a processing unit 210, a wireless communication unit 220, a display unit 230, an operation unit 240, a printing unit 250, and a storage unit 260.

The processing unit 210 controls each part of the electronic apparatus 200. Each part of the electronic apparatus 200 is, for example, the wireless communication unit 220, the storage unit 260, the printing unit 250, and the like. The processing unit 210 is specifically a processor or controller. For example, the processing unit 210 can include a plurality of CPUs such as a main CPU and a sub CPU. The main CPU controls each part of the electronic apparatus 200 and comprehensively controls the electronic apparatus 200. The sub CPU is, for example, a CPU performing communication control for the wireless communication unit 220. Alternatively, when the electronic apparatus 200 is a printer, another CPU performing various kinds of processing for printing may be provided.

The processing unit 210 in this embodiment can be formed of the following hardware. The hardware can include at least one of a circuit processing a digital signal and a circuit processing an analog signal. For example, the hardware can be formed of one or a plurality of circuit devices or one or a plurality of circuit elements installed on a circuit board. The circuit device is, for example, an integrated circuit device. The circuit element is, for example, a resistor, capacitor, or the like.

The processing unit 210 can also be implemented by the following processor. For example, the electronic apparatus 200 in this embodiment includes a memory storing information, and a processor operating based on the information stored in the memory. The information is, for example, a program and various data or the like. The processor includes hardware. As the processor, various processors such as a CPU (central processing unit), a GPU (graphics processing unit), and a DSP (digital signal processor) can be used. The memory may be a semiconductor memory such as an SRAM (static random-access memory) or DRAM (dynamic random-access memory), a register, a magnetic storage device such as a hard disk device, or an optical storage device such as an optical disk device. For example, the memory stores a computer-readable command, and the processor executes this command and thus implements the function of the processing unit 210 in the form of processing. The command in this case may be a command in a command set that forms a program, or a command instructing a hardware circuit in the processor to perform an operation. Also, the entirety or a part of the processing unit 210 may be implemented by cloud computing.

The wireless communication unit 220 performs, for example, wireless communication conforming to a predetermined wireless communication standard. For example, the wireless communication unit 220 performs wireless communication conforming to a predetermined wireless LAN standard. Specifically, the wireless communication unit 220 performs, for example, wireless communication conforming to the Wi-Fi (trademark registered) standard, which is one of the wireless LAN standards. For example, the wireless communication unit 220 is implemented by a wireless communication module. The wireless communication module includes at least one IC (integrated circuit). The IC is a semiconductor chip. For example, the wireless communication module includes a wireless communication IC as at least one IC. The wireless communication module may also include an interface IC and a memory IC other than the wireless communication IC. The wireless communication module may also have a wireless communication IC conforming to other standards than the wireless LAN standard, as the wireless communication IC. For example, the wireless communication module may include a wireless communication IC conforming to a short-range wireless communication such as Bluetooth (trademark registered). Specifically, the wireless communication module may include a wireless communication IC conforming to the BLE (Bluetooth Low Energy) standard. Alternatively, a wireless LAN and short-range wireless communication may be implemented by a one-chip wireless communication IC.

The display unit 230 is formed of a display or the like displaying various kinds of information to a user. The operation unit 240 is formed of a button or the like accepting an input operation from the user. The display unit 230 and the operation unit 240 may be formed in a unified manner, for example, by a touch panel.

The printing unit 250 includes a print engine. The print engine is a mechanical configuration to execute printing of an image on a print medium. The print engine includes, for example, a conveyor mechanism, an inkjet-type ejection head, a drive mechanism for a carriage including the ejection head, and the like. The print engine ejects an ink from the ejection head to a print medium conveyed by the conveyor mechanism and thus prints an image on the print medium. The print medium may be paper, cloth, or other types of medium. The specific configuration of the print engine is not limited to the example described here. The print engine may be configured to print with a toner by an electrophotography technique.

The storage unit 260 stores various kinds of information such as data and a program. The processing unit 210 and the wireless communication unit 220 operate, for example, using the storage unit 260 as a work area. The storage unit 260 may be a semiconductor memory such as an SRAM or DRAM, a register, a magnetic storage device, or an optical storage device. The storage unit 260 may store data transmitted via wireless communication from an information processing device connected to the external access point AP. The data in this case is, for example, data used for printing by the printing unit 250.

Figure 3:
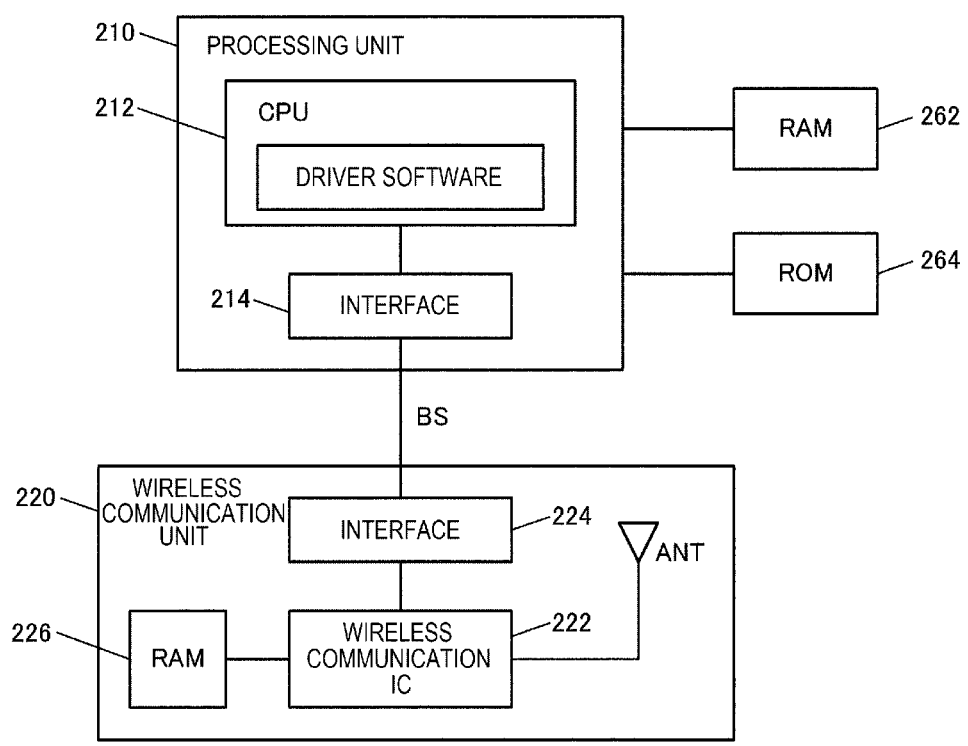
FIG. 3 shows a detailed configuration example of a processing unit and a wireless communication unit.

FIG. 3 shows a specific configuration example of the processing unit 210 and the wireless communication unit 220 in the electronic apparatus 200.

The processing unit 210 includes a CPU 212 and an interface 214. The CPU 212 is a processor. The interface 214 is an interface for performing, for example, wired communication between internal devices of the electronic apparatus 200. The interface 214 is a serial interface that can perform, for example, high-speed serial transfer. Specifically, the interface 214 is, for example, an interface conforming to the USB (Universal Serial Bus) communication standard. However, the interface 214 may be an interface conforming to other communication standards. The processing unit 210 is coupled to a RAM 262 and a ROM 264 forming the storage unit 260 shown in FIG. 2. The RAM 262 is, for example, an SRAM or DRAM and is used, for example, as a work memory for the processing unit 210. The ROM 264 is a memory that can hold information even when the power supply is cut off. The ROM 264 may be, for example, a ROM called non-volatile memory such as an EEPROM (electrically erasable programmable read-only memory) that can electrically erase data. The ROM 264 may also be a mask ROM.

The wireless communication unit 220 includes a wireless communication IC 222, an interface 224, a RAM 226, and an antenna unit ANT. The wireless communication IC 222, the interface 224, the RAM 226, and the antenna unit ANT together form a wireless communication module. As described above, a plurality of wireless communication ICs for different standards such as wireless LAN and short-range wireless communication may be provided as the wireless communication IC 222. The plurality of wireless communication ICs are a chipset for wireless communication.

The wireless communication IC 222 wirelessly communicates with an external device, using the antenna unit ANT. The wireless communication IC 222 can include, for example, a transceiver, which is a circuit on a physical layer of wireless communication, and a communication processing circuit performing processing on a link layer or the like. The transceiver includes, for example, a transmitting circuit and a receiving circuit for wireless communication. The communication processing circuit can be implemented, for example, by a processor such as a CPU. The interface 224 is, for example, an interface that can perform high-speed serial transfer and is in conformity with the same communication standard as the interface 214 of the processing unit 210. For example, the interface 224 is an interface conforming to the USB communication standard. The interface 214 of the processing unit 210 and the interface 224 of the wireless communication unit 220 are coupled together via a bus BS. The RAM 226 temporarily stores various data and programs. The communication processing circuit of the wireless communication IC 222 operates, using the RAM 226 as a work area.

2. Self-Repair and Reboot

In the communication system 10 shown in FIG. 1, there are cases where, after the electronic apparatus 200 and the external access point AP are wirelessly connected together, an error occurs in the wireless connection for some reason and disconnects the wireless connection. When the wireless connection between the electronic apparatus 200 and the external access point AP is disconnected in this way, a job sent by the user from the terminal device 100 to the electronic apparatus 200 via the external access point AP is not executed and this reduced the convenience of the user. In an example case where the electronic apparatus 200 is a printer, a print job cannot be executed.

When the wireless connection is disconnected as described above, a recovery method in which the disconnected state of the wireless connection is resolved by a user's manual operation may be employed. For example, the user goes to the place where the electronic apparatus 200 is located, and resets the wireless connection and turns on and off the power of the electronic apparatus 200. However, this recovery method has a problem in that it requires the user to perform complicated work and takes time and effort from the user. Also, trying to reset the wireless connection at random is likely to cause the following problems rather than the recovery of the wireless connection. For example, there is a problem in that an operation-disabled state of the user continues during the resetting of the wireless connection. There is also a problem in that the processing of the other functions of the electronic apparatus 200 is obstructed due to the processing for resetting the wireless connection. For example, when the electronic apparatus 200 is a printer, the printing processing is obstructed. Moreover, the user may end up repeating useless redoing despite no prospect of recovery of the wireless connection. This reduces the convenience of the user.

Thus, in this embodiment, when an error occurs in the wireless connection with the external access point AP, the processing unit 210 shown in FIGS. 2 and 3 performs a self-repair and reboot. For example, when an error occurs in the wireless connection by the wireless communication unit 220 with the external access point AP and the wireless connection is disconnected, the processing unit 210 executes the self-repair and reboot. Specifically, the processing unit 210 performs uninstallation of driver software for the wireless communication unit 220 and installation of the driver software after the uninstallation, as the self-repair and reboot. The self-repair and reboot is processing of performing the self-repair to recover from the error in the wireless connection and then restarting.

The driver software is software causing the wireless communication unit 220 to operate. Specifically, the driver software is software such as a program controlling the operation of the wireless communication IC 222 of the wireless communication unit 220. The driver software is stored, for example, in the ROM 264. The driver software is read out from the ROM 264 and thus installed. That is, installation to incorporate the driver software in an execution program of the CPU 212 in the processing unit 210 and make the driver software executable in this form is performed. The driver software is incorporated as a part of firmware of the processing unit 210. The processing unit 210 operates, based on this driver software as the execution program, and thus controls the wireless communication IC 222 and the like. For example, the processing unit 210 operates, based on the driver software, and thus makes various settings for the register or the like of the wireless communication IC 222 so as to cause the wireless communication IC 222 to operate. In the self-repair and reboot, the installed driver software is uninstalled. That is, uninstallation to delete the driver software from the execution program of the processing unit 210 is performed. At this time, the processing unit 210 may perform negotiation processing or the like with the wireless communication unit 220 and initialize various settings for the register or the like of the wireless communication IC 222. After the uninstallation, the processing unit 210 reinstalls the driver software from the ROM 264. Thus, when there is trouble with the register settings of the wireless communication IC 222 controlled by the driver software or when there is trouble with the driver software, such trouble can be resolved by reinstallation after uninstallation of the driver software. For example, when the register settings of the wireless communication IC 222 are eliminated or changed to wrong settings, the driver software newly installed after uninstallation can restore the correct register settings of the wireless communication IC 222. Thus, such uninstallation and installation enables the self-repair of the settings or the like of the wireless communication IC 222 and enables the recovery from the wireless connection error state.

The processing unit 210 also cuts off the power supply to the wireless communication unit 220 and resumes the power supply after the cut-off of the power supply, as the self-repair and reboot. For example, when the bus BS shown in FIG. 3 is a USB, the power supply to the wireless communication unit 220 is carried out via a VBUS of the USB. In the cut-off of the power supply, the power supply via the VBUS is not carried out. In the resumption of the power supply, the power supply via the VBUS is resumed after the cut-off of the power supply. Such cut-off and resumption of the power supply initializes the register settings or the like of the wireless communication IC 222 and therefore enables recovery from the wireless connection error state. However, when the power supply is cut off and resumed, it takes a long time to stabilize the power-supply voltage and it takes a long time for the analog circuit or the like of the wireless communication IC 222 to operate normally. Therefore, the self-repair and reboot based on the cut-off and resumption of the power supply takes a longer waiting time than the self-repair and reboot based on the uninstallation and installation of the driver software. Thus, in this embodiment, as will be described later, the self-repair and reboot based on the uninstallation and installation of the driver software is performed first, and when the error in the wireless connection is not resolved by this self-repair and reboot, the self-repair and reboot based on the cut-off and resumption of the power supply is performed.

Figure 4:
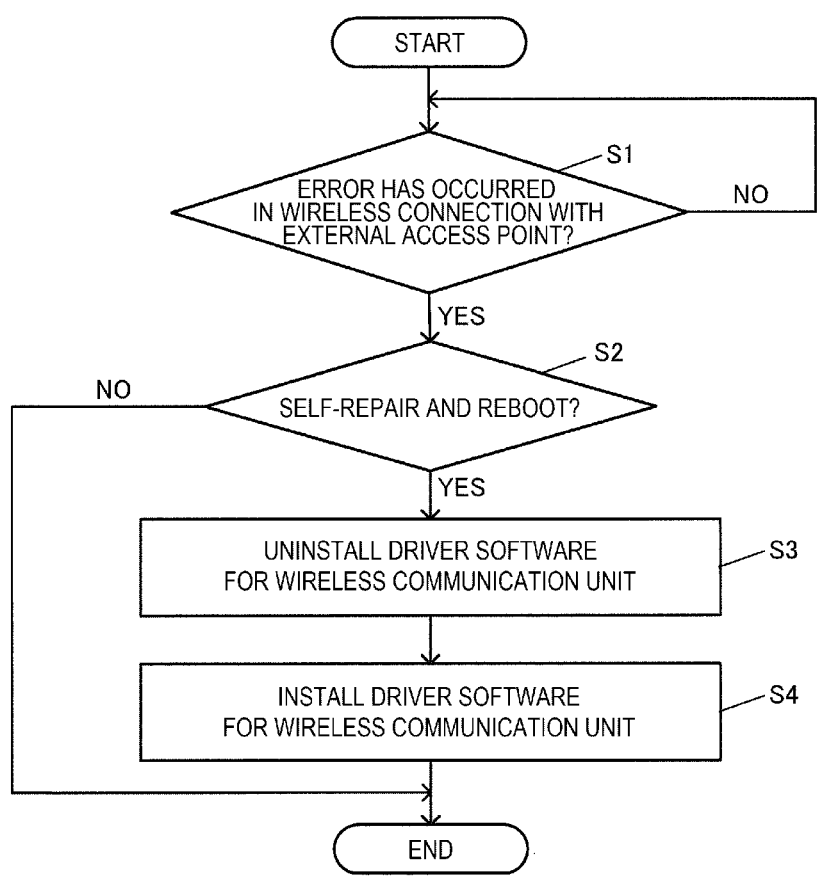
FIG. 4 is a flowchart explaining a processing example of self-repair and reboot.

Operations in this embodiment will now be described with reference to FIGS. 4, 5, and 6. FIG. 4 is a flowchart showing a processing example of the self-repair and reboot. As shown in FIG. 4, the processing unit 210 determines whether an error has occurred in the wireless connection with the external access point or not (step S1). For example, the processing unit 210 determines whether or not an error has occurred in the wireless connection, resulting in the disconnection of the wireless connection with the external access point. When an error has occurred in the wireless connection, the processing unit 210 determines whether to perform the self-repair and reboot or not (step S2). For example, when an execution condition for the self-repair and reboot as described later is met, the processing unit 210 determines that the self-repair and reboot is to be performed. Then, as the self-repair and reboot, the processing unit 210 uninstalls the driver software for the wireless communication unit 220 (step S3) described above. That is, the driver software is deleted from the execution program of the processing unit 210. After the uninstallation, the processing unit 210 installs the driver software for the wireless communication unit 220 (step S4). For example, the driver software is reinstalled from the ROM 264 shown in FIG. 3 and is incorporated in the execution program of the processing unit 210. Thus, the reinstalled driver software restores the correct settings with respect to various settings of the wireless communication unit 220 and enables recovery from the wireless connection error state.

Figure 5:
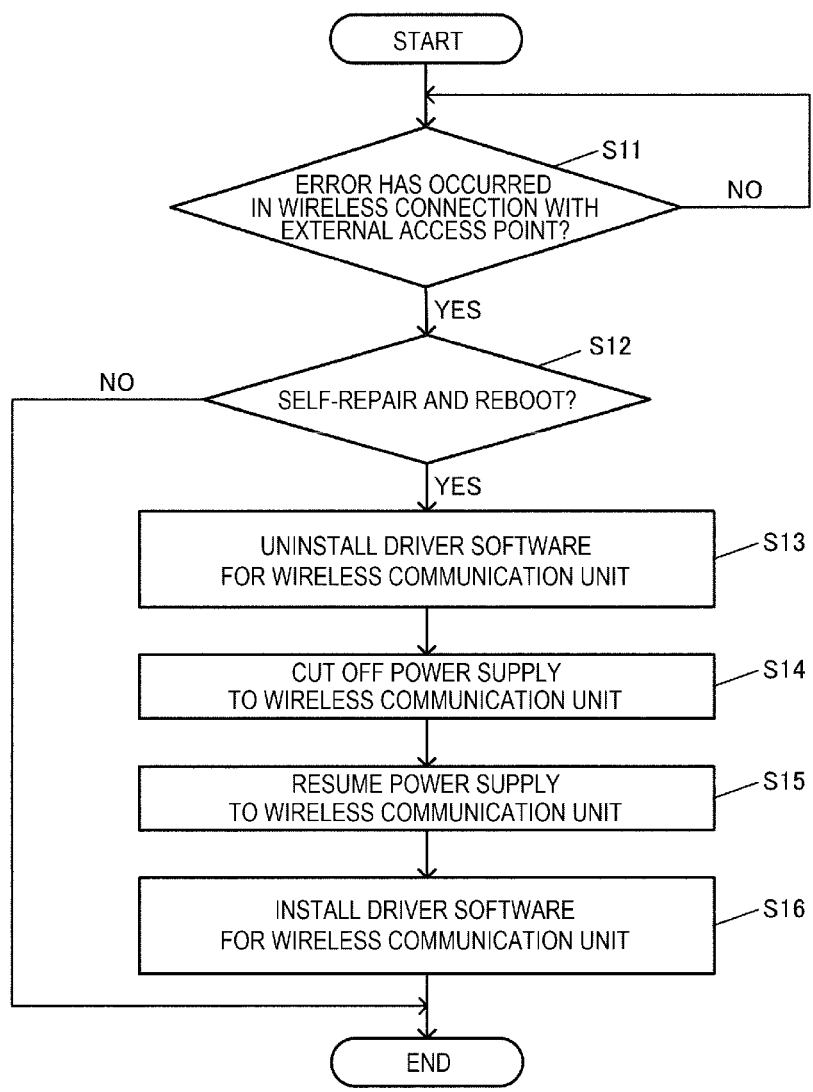
FIG. 5 is a flowchart explaining another processing example of self-repair and reboot.

FIG. 5 is a flowchart showing another processing example of the self-repair and reboot. The processing unit 210 determines whether an error has occurred in the wireless connection with the external access point or not, and determines whether or not to perform the self-repair and reboot when an error has occurred (steps S11, S12). When performing the self-repair and reboot, the processing unit 210 first uninstalls the driver software for the wireless communication unit 220, as the self-repair and reboot (step S13). After the uninstallation, the processing unit 210 cuts off the power supply to the wireless communication unit 220 and resumes the power supply after the cut-off of the power supply (steps S14, S15). After the resumption of the power supply, the processing unit 210 installs the driver software for the wireless communication unit 220 (step S16). Performing the cut-off and resumption of the power supply to the wireless communication unit 220 after the uninstallation of the driver software in this way initializes various settings of the wireless communication unit 220. Subsequently, the driver software is reinstalled and incorporated in the execution program of the processing unit 210. Thus, the driver software reinstalled for the wireless communication unit 220 in which various settings have been initialized by the cut-off and resumption of the power supply restores the correct settings with respect to the various settings of the wireless communication unit 220 and thus enables recovery from the wireless connection error state.

Figure 6:
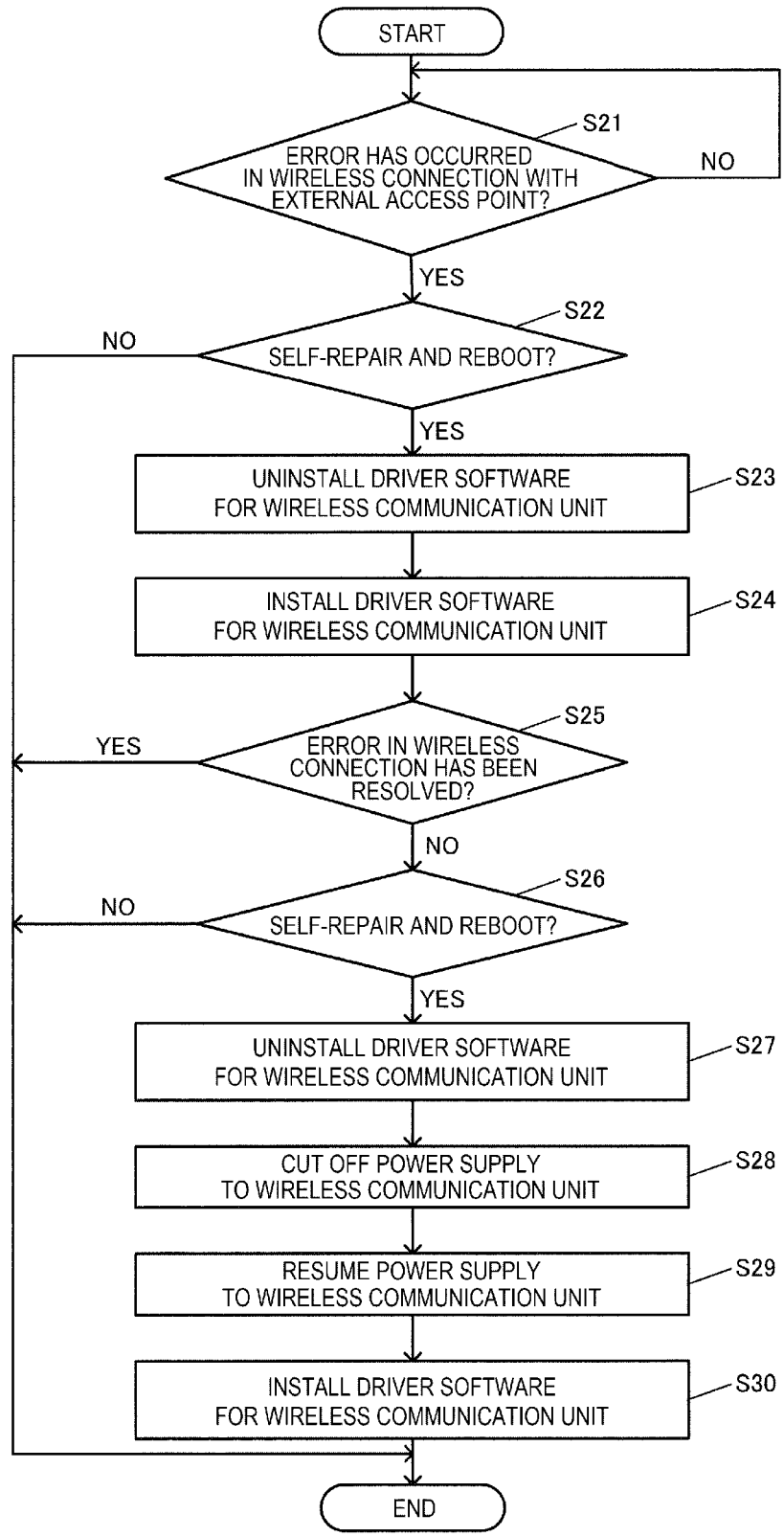
FIG. 6 is a flowchart explaining another processing example of self-repair and reboot.

FIG. 6, too, is a flowchart showing another processing example of the self-repair and reboot. The processing unit 210 determines whether an error has occurred in the wireless connection with the external access point or not, and determines whether or not to perform the self-repair and reboot when an error has occurred (steps S21, S22). When performing the self-repair and reboot, the processing unit 210 first uninstalls the driver software for the wireless communication unit 220 and installs the driver software after the uninstallation, as a first round of the self-repair and reboot (steps S23, S24). The processing unit 210 then determines whether the error in the wireless connection has been resolved by the first round of the self-repair and reboot or not (step S25). When the error has not been resolved, the processing unit 210 determines whether to perform a second round of the self-repair and reboot or not (step S26). On determining that the second round of the self-repair and reboot is to be performed, the processing unit 210 uninstalls the driver software for the wireless communication unit 220 and cuts off and resumes the power supply to the wireless communication unit 220 after the uninstallation (steps S27, S28, S29). After the resumption of the power supply, the processing unit 210 installs the driver software for the wireless communication unit 220 (step S30). Thus, in FIG. 6, in the first round of the self-repair and reboot, the driver software is uninstalled and installed as in FIG. 4. When the error in the wireless connection has not been resolved by the first round of the self-repair and reboot, the second round of the self-repair and reboot is performed. That is, as the second round of the self-repair and reboot, the driver software is uninstalled, the power supply is then cut off and resumed, and the driver software is subsequently installed, as in FIG. 5.

For example, the self-repair and reboot based on the uninstallation and installation of the driver software can be completed in a shorter time than the self-repair and reboot including the cut-off and resumption of the power supply. Therefore, in FIG. 6, the first round of the self-repair and reboot based on the uninstallation and installation of the driver software is performed first. When the error in the wireless connection has not been resolved by the first round of the self-repair and reboot, the second round of the self-repair and reboot including the cut-off and resumption of the power supply is performed. Due to the need to stabilize the power-supply voltage or the like, the self-repair and reboot including the cut-off and resumption of the power supply takes a longer time than the self-repair and reboot based on the uninstallation and installation but can securely initialize the settings of the wireless communication unit 220 and therefore increase the probability of recovery from the error state. Thus, in FIG. 6, first, the first round of the self-repair and reboot based on the uninstallation and installation, which takes a shorter time, is performed first, and when the error state has not been resolved by this, the second round of the self-repair and reboot including the cut-off and resumption of the power supply, which increases the probability of recovery from the error state, is performed. Performing the self-repair and reboot in two stages in this way enables an increase in the probability of recovery from the wireless connection error state while minimizing the time taken for the self-repair and reboot.

As described above, the electronic apparatus 200 in this embodiment includes the wireless communication unit 220 wirelessly communicating with an external access point, and the processing unit 210 performing communication control for the wireless communication unit 220. As shown in FIG. 4, when an error has occurred in the wireless connection with the external access point, the processing unit 210 uninstalls the driver software causing the wireless communication unit 220 to operate, and installs the driver software after the uninstallation, as the self-repair and reboot. Thus, when there is trouble with the wireless communication unit 220 controlled by the driver software or when there is trouble with the driver software, the driver software is uninstalled and thus deleted. Then, as the driver software is reinstalled and the wireless communication unit 220 is controlled by the reinstalled driver software, the trouble can be resolved. That is, as the reinstalled driver software properly operates, the correct settings of the wireless communication unit 220 can be restored. This enables self-repair of the settings and recovery from the wireless connection error state. The self-repair and reboot is automatically executed on the occurrence of the error in the wireless connection with the external access point. Therefore, the recovery from the wireless connection error state does not take time and effort from the user and this improves the convenience of the user. For example, the situation where the user repeats useless redoing again and again in order to recover from the error state can be prevented. The self-repair and reboot based on the uninstallation and installation of the driver software can be completed in a short time. Therefore, the situation where the other processing by the electronic apparatus 200 is obstructed due to the processing of the self-repair and reboot can be prevented.

Also, in this embodiment, as shown in FIG. 5, the processing unit 210 uninstalls the driver software, cuts off the power supply to the wireless communication unit 220 after the uninstallation, resumes the power supply after the cut-off of the power supply, and installs the driver software after the resumption of the power supply, as the self-repair and reboot. For example, the processing unit 210 executes not only the uninstallation and installation of the driver software but also the cut-off and resumption of the power supply to the wireless communication unit 220, as the self-repair and reboot. Performing the cut-off and resumption of the power supply in this way can securely initialize the settings or the like of the wireless communication unit 220 and therefore can increase the probability of recovery from the wireless connection error state. Since the driver software is uninstalled before the cut-off and resumption of the power supply and the driver software is installed after the cut-off and resumption of the power supply, the wireless communication unit 220 can be properly controlled using the driver software without any trouble. Thus, the probability of recovery from the wireless connection error state can be increased further.

Also, in this embodiment, as shown in FIG. 6, when the error has not been resolved by the uninstallation and installation, the processing unit 210 cuts off the power supply to the wireless communication unit 220 and resumes the power supply after the cut-off of the power supply, as the self-repair and reboot. For example, when the error in the wireless connection has not been resolved by the first round of the self-repair and reboot based on the uninstallation and installation of the driver software, the processing unit 210 performs the second round of the self-repair and reboot including the cut-off and resumption of the power supply. Thus, as the first round of the self-repair and reboot based on the uninstallation and installation is performed first, even when there is trouble with the wireless communication unit 220 or the driver software, the wireless communication unit 220 can be properly controlled by the reinstalled driver software and the recovery from the wireless connection error state is enabled. Since the first round of the self-repair and reboot based on the uninstallation and installation can be completed in a short time, the adverse effects of the first round of the self-repair and reboot on the other processing can be minimized. When the recovery from the wireless connection error state cannot be made by the first round of the self-repair and reboot based on the uninstallation and installation, the processing unit 210 executes the second round of the self-repair and reboot including the cut-off and resumption of the power supply. The second round of the self-repair and reboot including the cut-off and resumption of the power supply takes a longer time than the first round of the self-repair and reboot based on the uninstallation and installation but can securely initialize the settings or the like of the wireless communication unit 220 and therefore increase the probability of recovery from the error state. Thus, a self-repair and reboot that can increase the probability of recovery from the wireless connection error state while minimizing the obstruction to the other processing by the electronic apparatus 200 can be achieved.

3. Detailed Operations

Detailed operation examples in this embodiment will now be described with reference to FIGS. 7, 8, and 9. FIG. is a flowchart explaining processing of periodical reconnection. First, whether the wireless connection with the external access point has been disconnected or not is determined (step S31). When it is determined that the wireless connection has been disconnected, reconnection processing is performed (step S32). As will be described later, the self-repair and reboot according to this embodiment is performed in this reconnection processing. When the reconnection with the external access point is successful by the reconnection processing, the processing ends (step S33). Meanwhile, when the reconnection with the external access point is unsuccessful, the processing waits for a predetermined period (step S34). For example, the processing waits for a predetermined time such as one hour to several hours. After the lapse of the predetermined period, the reconnection processing in step S32 is executed.

Figure 7:
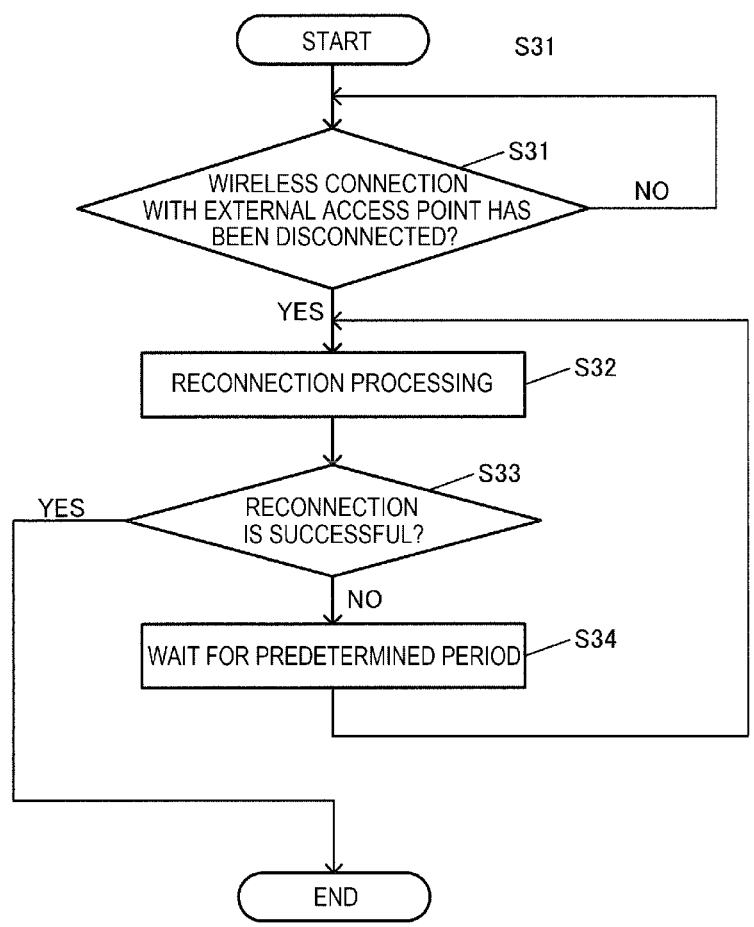
FIG. 7 is a flowchart explaining reconnection processing.

In this way, in this embodiment, the processing unit 210 performs the self-repair and reboot in the reconnection processing when the wireless connection with the external access point has been disconnected, as shown in FIG. 7. That is, the processing unit 210 performs the self-repair and reboot in the reconnection processing in step S32 when it is determined in step S31 that the wireless connection with the external access point has been disconnected. The reconnection processing is performed every predetermined period, which is a long time interval such as one hour to several hours. The processing unit 210 executes the self-repair and reboot when a predetermined execution condition is met in the reconnection processing performed every such predetermined period. Thus, the self-repair and reboot can be automatically executed in the reconnection processing when the wireless connection has been disconnected. This improves the convenience of the user. Also, since the self-repair and reboot can be executed in the reconnection processing that is periodically executed, the situation where the self-repair and reboot is frequently performed, obstructing the other processing by the electronic apparatus 200, can be prevented.

Figure 8:
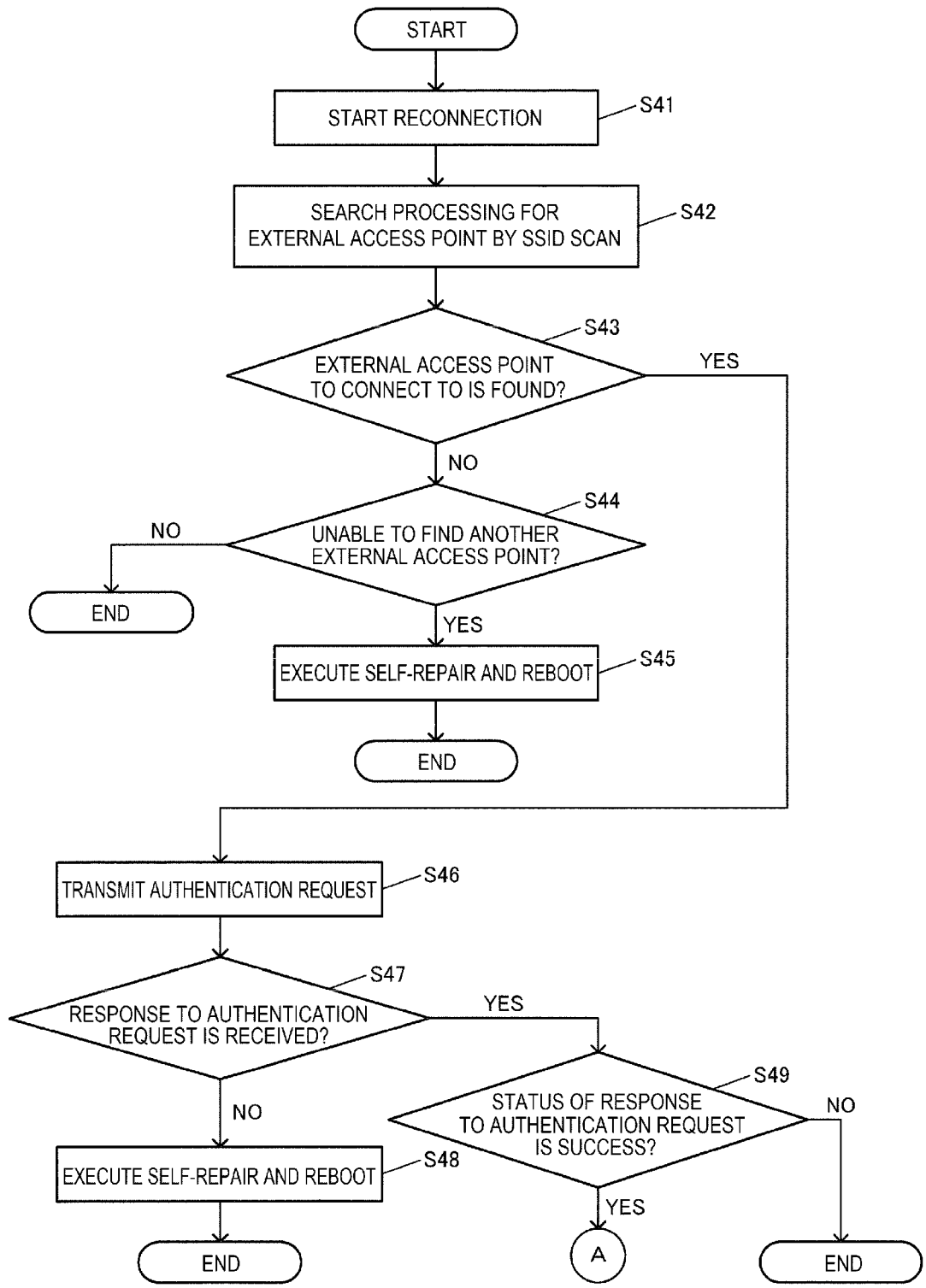
FIG. 8 is a flowchart explaining details of the reconnection processing.
Figure 9:
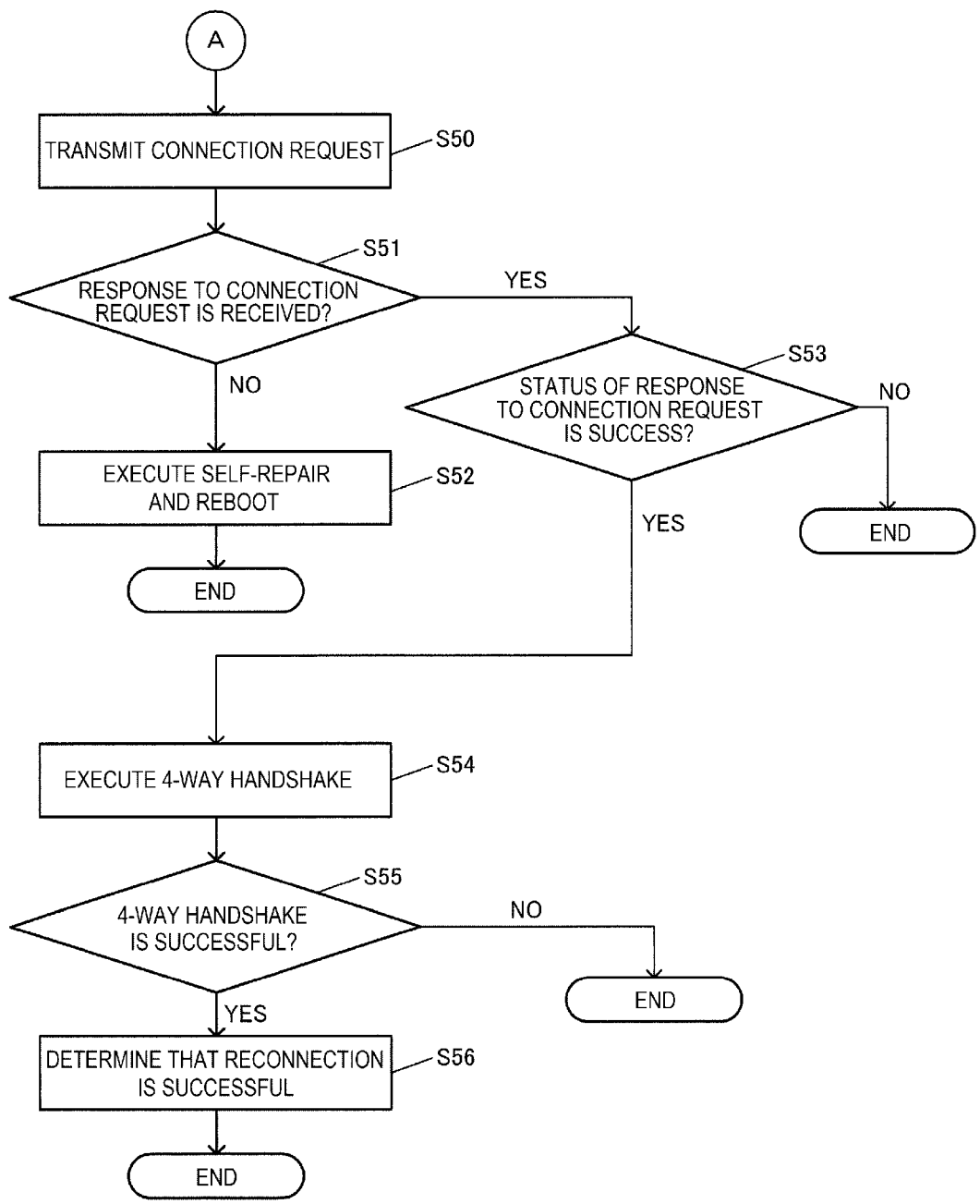
FIG. 9 is a flowchart explaining details of the reconnection processing.

FIGS. 8 and 9 are flowcharts explaining details of the reconnection processing in step S32 in FIG. 7. As the reconnection with the external access point is started, the processing unit 210 performs search processing for the external access point by SSID scan (steps S41, S42). An SSID (service set identifier) is an identifier of the external access point in the wireless LAN. The SSID scan is a processing of searching for the identifier of the external access point.

Next, the processing unit 210 determines whether the external access point to connect to is found by the SSID scan or not (step S43). The external access point to connect to is an external access point that is the target of the reconnection processing, for example, the external access point connected before the reconnection processing. When the external access point to connect to is not found, the processing unit 210 determines whether or not the search is unable to find another external access point than this external access point (step S44). When the search is unable to find another external access point, the processing unit 210 executes the self-repair and reboot (step S45). Meanwhile, when another external access point is found, the reconnection processing ends without executing the self-repair and reboot. For example, the situation where neither the external access point to connect to nor other external access points exist around the electronic apparatus 200 is not very likely. In such a situation, there is a high probability of an error occurring in the wireless connection, for example, due to trouble with the wireless communication unit 220 or trouble with the driver software or the like. Therefore, the self-repair and reboot is executed. In the self-repair and reboot, the driver software is uninstalled and installed, or the power supply to the wireless communication unit 220 is cut off and resumed. Thus, even when there is trouble with the wireless communication unit 220 or the driver software, the trouble can be resolved and the recovery from the wireless connection error state is enabled.

Next, when the external access point to connect to is found, the processing unit 210 performs processing of transmitting an authentication request (step S46). The authentication request is an authentication request in the wireless LAN. Exchanging authentication, which is authentication information, between the electronic apparatus 200 and the external access point implements authentication processing. After transmitting the authentication request, the processing unit 210 determines whether a response to the authentication request is received or not (step S47). When a response to the authentication request is not received, the processing unit 210 executes the self-repair and reboot (step S48). That is, when the external access point to connect to is found by the SSID scan and the processing unit 210 transmits an authentication request to this external access point but does not receive a response to the authentication request, it is conceivable that there is some trouble with the wireless communication unit 220 or the driver software or the like. Therefore, the self-repair and reboot is executed in this case. In the self-repair and reboot, the driver software is uninstalled and installed, or the power supply to the wireless communication unit 220 is cut off and resumed. Therefore, the recovery from the wireless connection error state is enabled.

When a response to the authentication request is received, the processing unit 210 determines whether the status of the response to the authentication request is "success" or not (step S49). When the status of the response to the authentication request is not "success", it is conceivable that the authentication has failed though the wireless connection with the external access point has been done normally. Therefore, the reconnection processing ends without executing the self-repair and reboot.

When the status of the response to the authentication request is "success", the processing unit 210 performs processing of transmitting a connection request (step S50). The connection request is an association request in the wireless LAN. That is, when the external access point determines that the electronic apparatus 200 is a correct client based on the authentication, the processing unit 210 of the client electronic apparatus 200 sends a connection request to the external access point. After transmitting the connection request, the processing unit 210 determines whether a response to the connection request is received or not (step S51). When a response to the connection request is not received, the processing unit 210 executes the self-repair and reboot (step S52). That is, when the external access point to connect to is found by the SSID scan, the authentication is successful, and the processing unit 210 transmits a connection request to this external access point but does not receive a response to the connection request, it is conceivable that there is some trouble with the wireless communication unit 220 or the driver software or the like. Therefore, the self-repair and reboot is executed in this case. In this manner, in the self-repair and reboot, the driver software is uninstalled and installed, or the power supply to the wireless communication unit 220 is cut off and resumed. Therefore, the recovery from the wireless connection error state is enabled.

When a response to the connection request is received, the processing unit 210 determines whether the status of the response to the connection request is "success" or not (step S53). When the status of the response to the connection request is not "success", it is conceivable that the connection has failed though the wireless connection and the authentication with the external access point have been done normally. Therefore, the reconnection processing ends without executing the self-repair and reboot.

Meanwhile, when the status of the response to the connection request is "success", the processing unit 210 executes 4-way handshake (step S54). The 4-way handshake is a procedure for exchanging an encryption key between the client electronic apparatus 200 and the external access point. In the 4-way handshake, encryption keys, which are a PTK (Pairwise Transient Key) and a GTK (Group Temporal Key) are exchanged. When the 4-way handshake is successful, the processing unit 210 determines that the reconnection is successful (steps S55, S56). Meanwhile, when the 4-way handshake is not successful, the reconnection processing ends without executing the self-repair and reboot.

As described above, in this embodiment, the processing unit 210 performs search processing for the external access point when an error has occurred in the wireless connection with the external access point. That is, the processing unit 210 performs the search processing for the external access point by SSID scan as shown in step S42 in FIG. 8. The processing unit 210 then performs the self-repair and reboot when the processing unit 210 finds neither the external access point with which the error has occurred in the wireless connection nor another external access point, as shown in steps S43, S44, and S45. For example, the situation where neither the external access point that is the target of reconnection nor another external access point is found means that there is no external access point around the electronic apparatus 200. This situation is not very likely. In such a situation, it is conceivable that the error has occurred in the wireless connection due to trouble or the like with the wireless communication unit 220. Therefore, the self-repair and reboot is executed. Thus, the driver software is uninstalled and installed, or the power supply to the wireless communication unit 220 is cut off and resumed, thus enabling the recovery from the wireless connection error state.

Also, in this embodiment, the processing unit 210 performs search processing for the external access point when an error has occurred in the wireless connection with the external access point. The processing unit 210 then performs the self-repair and reboot as shown in step S48, when the processing unit 210 finds the external access point as shown in step S43 but does not receive a response to an authentication request to the external access point as shown in step S47. For example, when the external access point that is the target of reconnection is found and an authentication request is transmitted to this external access point but a response to the authentication request is not received, it is conceivable that there is some trouble with the wireless communication unit 220 or the like. In this case, it is conceivable that the error has occurred in the wireless connection due to the wireless communication unit 220 or the like. Therefore, the self-repair and reboot is executed. Thus, the recovery from the wireless connection error state is enabled.

Also, in this embodiment, the processing unit 210 performs search processing for the external access point when an error has occurred in the wireless connection with the external access point. The processing unit 210 then performs the self-repair and reboot as shown in step S52, when the processing unit 210 finds the external access point as shown in step S43 but does not receive a response to a connection request to the external access point as shown in step S51. Specifically, when the external access point is found and the authentication with this external access point is successful but a response to a connection request to the external access point is not received, the self-repair and reboot is performed. For example, when the external access point that is the target of reconnection is found and a connection request is transmitted to this external access point but a response to the connection request is not received, it is conceivable that there is some trouble with the wireless communication unit 220 or the like. In this case, it is conceivable that the error has occurred in the wireless connection due to the wireless communication unit 220 or the like. Therefore, the self-repair and reboot is executed. Thus, the recovery from the wireless connection error state is enabled.

As described above, in FIGS. 8 and 9, the processing unit 210 performs the self-repair and reboot when a predetermined execution condition is met, instead of constantly performing the self-repair and reboot in the reconnection processing. For example, the processing unit 210 performs the self-repair and reboot when the execution condition in step S44, the execution condition in step S47, or the execution condition in step S51 is met. Thus, the situation where the self-repair and reboot is unconditionally executed in the reconnection processing and obstructs the other processing by the electronic apparatus 200 can be prevented. Therefore, both the recovery from the wireless connection error state based on the self-repair and reboot and the prevention of a drop in the processing efficiency of the electronic apparatus 200 due to an unconditional self-repair and reboot can be achieved.

4. Internal Access Point

Figure 10:
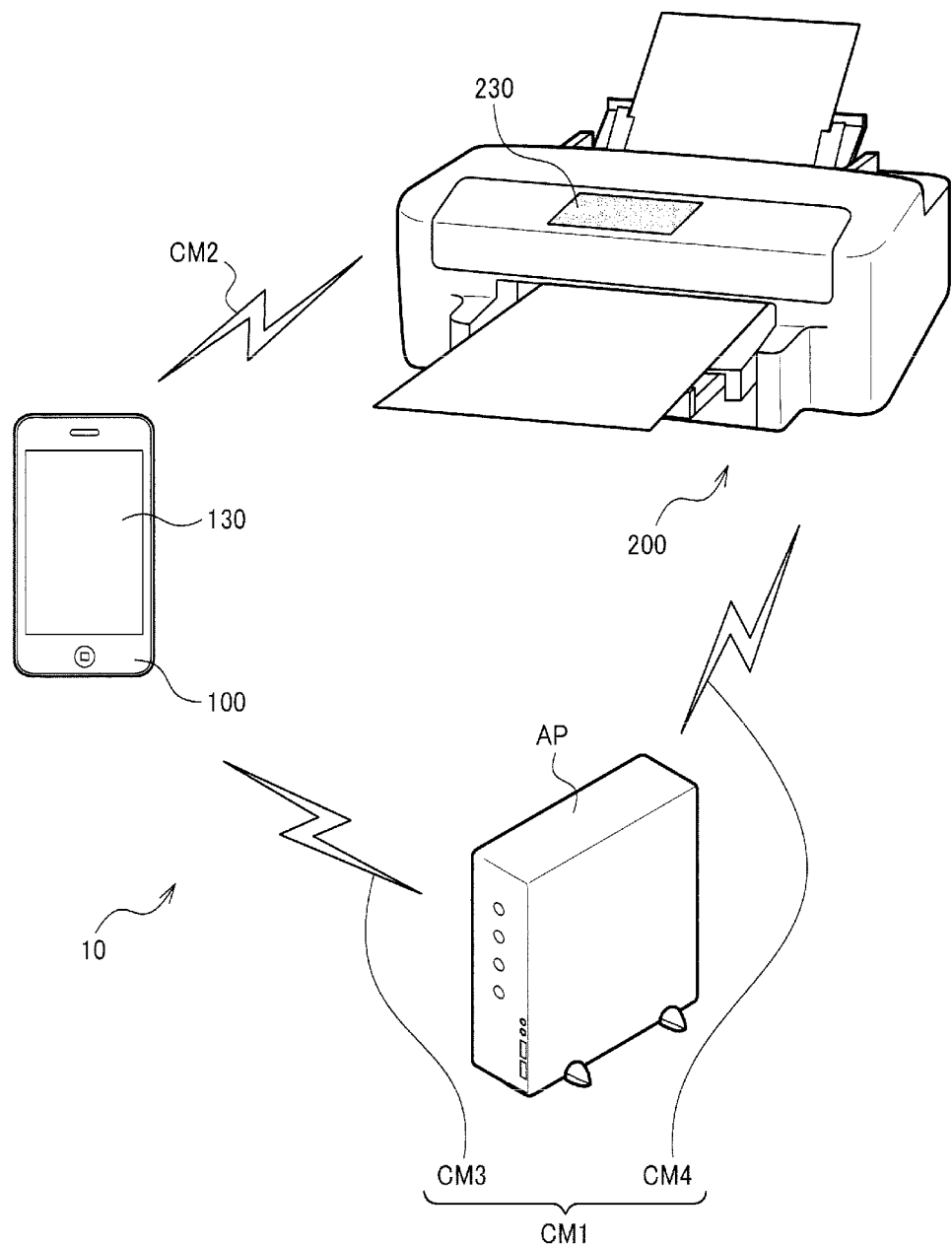
FIG. 10 shows a configuration example of a communication system where wireless communication via an internal access point is enabled.

FIG. 10 shows another configuration example of the communication system 10. The communication system 10 shown in FIG. 10 is a system where wireless communication via an internal access point is enabled. FIG. 10 shows an example case where the electronic apparatus 200 is a printer and where the terminal device 100 is a portable terminal device such as a smartphone.

For example, both the terminal device 100 and the electronic apparatus 200 can operate as a station. The terminal device 100 and the electronic apparatus 200 connect respectively to the external access point AP, thus implementing communication between the terminal device 100 and the electronic apparatus 200. The external access point AP is, for example, a wireless router having a router function. In FIG. 10, the communication between the terminal device 100 and the electronic apparatus 200 via the external access point AP is referred to as first wireless communication CM1. As shown in FIG. 10, the first wireless communication CM1 is implemented by third wireless communication CM3 between the terminal device 100 and the external access point AP and fourth wireless communication CM4 between the electronic apparatus 200 and the external access point AP.

The electronic apparatus 200 can activate an internal access point, not illustrated. The internal access point can also be referred to as a software access point. The terminal device 100 connects to the internal access point of the electronic apparatus 200. In FIG. 10, direct connection between the terminal device 100 and the electronic apparatus 200 using the internal access point is referred to as second wireless communication CM2.

In the case of the communication system 10 shown in FIG. 10, the wireless communication unit 220 in FIG. 2 can include a first wireless communication unit and a second wireless communication unit, not illustrated. The first wireless communication unit performs wireless communication when the electronic apparatus 200 operates as a Wi-Fi station. For example, the first wireless communication unit executes the fourth wireless communication CM4, which is the communication with the external access point AP. The second wireless communication unit performs wireless communication when the electronic apparatus 200 operates as a Wi-Fi access point. The second wireless communication unit activates the internal access point, accepts connection from the terminal device 100, and thus executes the second wireless communication CM2.

The wireless communication unit 220 performs wireless communication conforming to the Wi-Fi standard. The wireless communication unit 220 then supports the Wi-Fi Direct (trademark registered) standard. The first wireless communication unit and the second wireless communication unit may be implemented by different wireless communication ICs from each other. Alternatively, the first wireless communication unit and the second wireless communication unit may be implemented by a common wireless communication IC. For example, a single wireless communication IC may execute the first wireless communication CM1 and the second wireless communication CM2 in time division, thus implementing the first wireless communication unit and the second wireless communication unit. Also, the wireless communication unit 220 may be able to execute wireless communication conforming to other standards than the Wi-Fi standard.

In this way, in this embodiment, the wireless communication unit 220 performs the first wireless communication via the external access point AP and the second wireless communication via the internal access point. The processing unit 210 performs the self-repair and reboot on condition that the wireless communication unit 220 has not activated the internal access point. For example, the processing unit 210 performs the self-repair and reboot on condition that the second wireless communication CM2 based on the direct connection via the internal access point is not being performed. That is, when the second wireless communication CM2 based on the direct connection is being performed, the self-repair and reboot is not executed even if the execution condition for the self-repair and reboot is met. For example, when the internal access point is activated, the electronic apparatus 200 functions as an access point and accepts a job such as a print job from the terminal device 100. Then, if the user directly connects the terminal device 100 to the electronic apparatus 200 by the second wireless communication CM2 and the self-repair and reboot is executed unconditionally while the electronic apparatus 200 is printing, a situation such as the interruption of the printing against the user's intention occurs. Thus, the processing unit 210 executes the self-repair and reboot on condition that the internal access point is not activated. This can prevent from occurring trouble such as the interruption of a job using the internal access point due to unintended execution of the self-repair and reboot during the second wireless communication CM2 via the internal access point.

Figure 11:
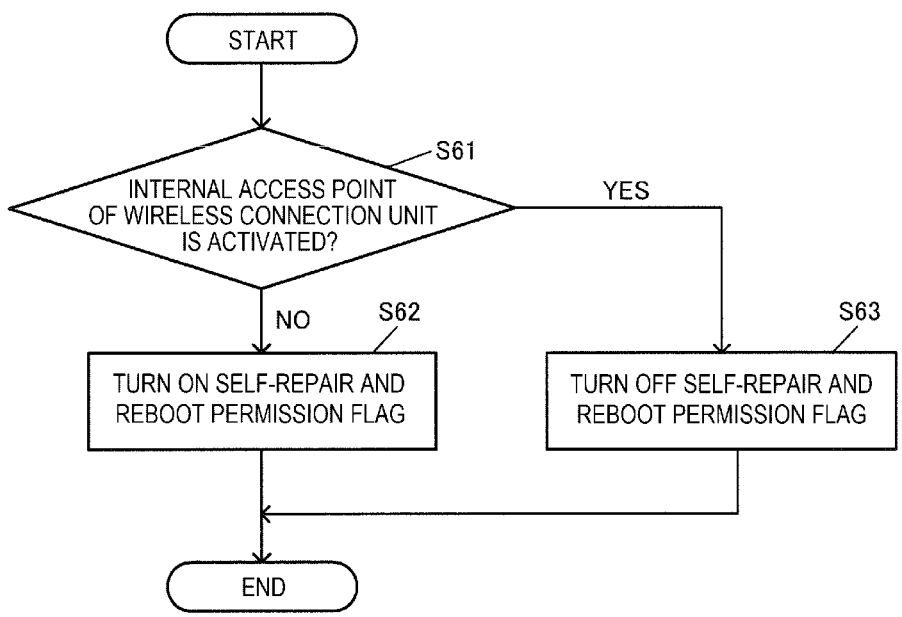
FIG. 11 is a flowchart explaining processing of performing a self-repair and reboot on condition that the internal access point is not activated.

FIG. 11 is a flowchart explaining the processing of performing the self-repair and reboot on condition that the internal access point is not activated. First, the processing unit 210 determines whether the internal access point of the wireless communication unit 220 is activated or not (step S61). For example, when the user at the terminal device 100 operates to choose to directly connect to the electronic apparatus 200, the internal access point is activated. When it is determined that the internal access point is not activated, the processing unit 210 turns on a self-repair and reboot permission flag (step S62). Meanwhile, when it is determined that the internal access point is activated, the processing unit 210 turns off the self-repair and reboot permission flag (step S63). In the case where the self-repair and reboot permission flag is off, the processing unit 210 does not execute the self-repair and reboot even when the execution condition in step S44, S47 or S51 in FIGS. 8 and 9 is met. Meanwhile, when the self-repair and reboot permission flag is on, the processing unit 210 executes the self-repair and reboot when the execution condition in step S44, S47 or S51 is met. Thus, the processing of performing the self-repair and reboot on condition that the internal access point is not activated can be implemented.

As described above, the electronic apparatus according to the embodiment includes: a wireless communication unit wirelessly communicating with an external access point; and a processing unit performing communication control for the wireless communication unit. The processing unit performs uninstallation of driver software causing the wireless communication unit to operate and installation of the driver software after the uninstallation, as a self-repair and reboot, when there is an error in wireless connection with the external access point.

According to the embodiment, when an error has occurred in the wireless connection with the external access point, the uninstallation and installation of the driver software for the wireless communication unit is performed as a self-repair and reboot. Thus, even when there is trouble with the wireless communication unit controlled by the driver software or with the driver software, the driver software is uninstalled and reinstalled. As the wireless communication unit is controlled by the reinstalled driver software, the trouble can be resolved. This enables the self-repair of the wireless communication via the external access point and automatic recovery from a wireless connection error state.

In the embodiment, the processing unit may perform the uninstallation of the driver software, cut-off of power supply to the wireless communication unit after the uninstallation, resumption of the power supply after the cut-off, and the installation of the driver software after the resumption of the power supply, as the self-repair and reboot.

Such cut-off and resumption of the power supply enables initialization of settings or the like of the wireless communication unit and therefore can increase the probability of recovery from the wireless connection error state.

In the embodiment, the processing unit may perform cut-off of power supply to the wireless communication unit and resumption of the power supply after the cut-off of the power supply, as the self-repair and reboot, when the error is not resolved by the uninstallation and the installation.

Thus, even when the error in the wireless connection is not resolved by the self-repair and reboot including the uninstallation and the installation, performing the next self-repair and reboot including the cut-off and resumption of the power supply can increase the probability of recovery from the wireless connection error state.

In the embodiment, the processing unit may perform search processing for the external access point when there is the error in the wireless connection with the external access point, and may perform the self-repair and reboot when neither the external access point with which there is the error in the wireless connection nor another external access point is found.

For example, the situation where neither the external access point with which there is the error in the wireless connection nor another external access point is found is not very likely. In such a situation, executing the self-repair and reboot enables proper recovery from the wireless connection error state.

In the embodiment, the processing unit may perform search processing for the external access point when there is the error in the wireless connection with the external access point, and may perform the self-repair and reboot, when the external access point is found but a response to an authentication request to the external access point is not received.

For example, when the external access point is found and an authentication request is transmitted to this external access point but a response to the authentication request is not received, it is conceivable that there is some trouble with the wireless communication unit. Therefore, in this case, executing the self-repair and reboot enables proper recovery from the wireless connection error state.

In the embodiment, the processing unit may perform search processing for the external access point when there is the error in the wireless connection with the external access point, and may perform the self-repair and reboot, when the external access point is found but a response to a connection request to the external access point is not received.

For example, when the external access point is found and a connection request is transmitted to this external access point but a response to the connection request is not received, it is conceivable that there is some trouble with the wireless communication unit. Therefore, in this case, executing the self-repair and reboot enables proper recovery from the wireless connection error state.

In the embodiment, the processing unit may perform the self-repair and reboot in reconnection processing when the wireless connection with the external access point that is connected is disconnected.

Thus, the self-repair and reboot can be automatically executed in the reconnection processing when the wireless connection is disconnected. This improves the convenience of the user.

In the embodiment, the wireless communication unit may perform first wireless communication via the external access point and second wireless communication via an internal access point. The processing unit may perform the self-repair and reboot on condition that the wireless communication unit does not activate the internal access point.

Thus, the occurrence of trouble such as the interruption of a job using the internal access point due to unintended execution of the self-repair and reboot during the second wireless communication via the internal access point is performed can be prevented.

The embodiment also relates to a communication control method for wireless communication with an external access point via a wireless communication unit. The communication control method includes: determining whether there is an error in wireless connection with the external access point or not; and performing uninstallation of driver software causing the wireless communication unit to operate and installation of the driver software after the uninstallation, as a self-repair and reboot, when there is the error in the wireless connection with the external access point.

The embodiment has been described in detail. However, a person skilled in the art can readily understand that various modifications can be made without substantially departing from the new matters and effects of the embodiment. Therefore, all such modification examples are included in the scope of the disclosure. For example, a term described along with a different term having a broader meaning or the same meaning at least once in the specification or the drawings can be replaced with the different term at any part of the specification or the drawings. All combinations of the embodiment and modification examples are included in the scope of the disclosure. The configuration and operation or the like of the electronic apparatus or the like are not limited to those described in the embodiment and can be implemented with various modifications.

What is claimed is:

1. An electronic apparatus comprising:
   a wireless communication unit wirelessly communicating with an external access point; and
   a processing unit performing communication control for the wireless communication unit,
   the processing unit determining whether wireless connection with the external access point is disconnected due to an error in the wireless connection with the external access point, and
   the processing unit performing a self-repair and reboot including uninstallation of driver software causing the wireless communication unit to operate and installation of the driver software after the uninstallation, in response to determining that the wireless connection with the external access point is disconnected due to the error in the wireless connection with the external access point.

2. The electronic apparatus according to claim 1, wherein the processing unit performs the self-repair and reboot including the uninstallation of the driver software, cut-off of power supply to the wireless communication unit after the uninstallation, resumption of the power supply after the cut-off, and the installation of the driver software after the resumption of the power supply.

3. The electronic apparatus according to claim 1, wherein the processing unit performs the self-repair and reboot including cut-off of power supply to the wireless communication unit and resumption of the power supply after the cut-off of the power supply, when the error is not resolved by the uninstallation and the installation.

4. The electronic apparatus according to claim 1, wherein the processing unit performs search processing for the external access point in response to determining that the wireless connection with the external access point is disconnected due to the error in the wireless connection with the external access point, and performs the self-repair and reboot when neither the external access point with which there is the error in the wireless connection nor another external access point is found.

5. The electronic apparatus according to claim 1, wherein the processing unit performs search processing for the external access point in response to determining that the wireless connection with the external access point is disconnected due to the error in the wireless connection with the external access point, and performs the self-repair and reboot, when the external access point is found but a response to an authentication request to the external access point is not received.

6. The electronic apparatus according to claim 1, wherein the processing unit performs search processing for the external access point in response to determining that the wireless connection with the external access point is disconnected due to the error in the wireless connection with the external access point, and performs the self-repair and reboot, when the external access point is found but a response to a connection request to the external access point is not received.

7. The electronic apparatus according to claim 1, wherein the processing unit performs the self-repair and reboot in reconnection processing when the wireless connection with the external access point that is connected is disconnected.

8. The electronic apparatus according to claim 1, wherein the wireless communication unit performs first wireless communication via the external access point and second wireless communication via an internal access point, and
   the processing unit performs the self-repair and reboot on condition that the wireless communication unit does not activate the internal access point.

9. A communication control method for wireless communication with an external access point via a wireless communication unit, the communication control method comprising:
   determining whether wireless connection with the external access point is disconnected due to an error in the wireless connection with the external access point or not; and
   performing a self-repair and reboot including uninstallation of driver software causing the wireless communication unit to operate and installation of the driver software after the uninstallation, in response to determining that the wireless connection with the external access point is disconnected due to the error in the wireless connection with the external access point.

* * * * *